Oct. 18, 1955     O. H. VALENTINE ET AL     2,720,678
APPARATUS FOR SEPARATING THE MEMBRANES OF ANIMAL INTESTINES
Filed Oct. 16, 1953     4 Sheets-Sheet 1

INVENTOR:
ORVILLE H. VALENTINE
BY JOSEPH J. GORALCZYK
RAYMOND W. BERGMAN

ATTORNEY

Oct. 18, 1955     O. H. VALENTINE ET AL     2,720,678
APPARATUS FOR SEPARATING THE MEMBRANES OF ANIMAL INTESTINES
Filed Oct. 16, 1953     4 Sheets-Sheet 2
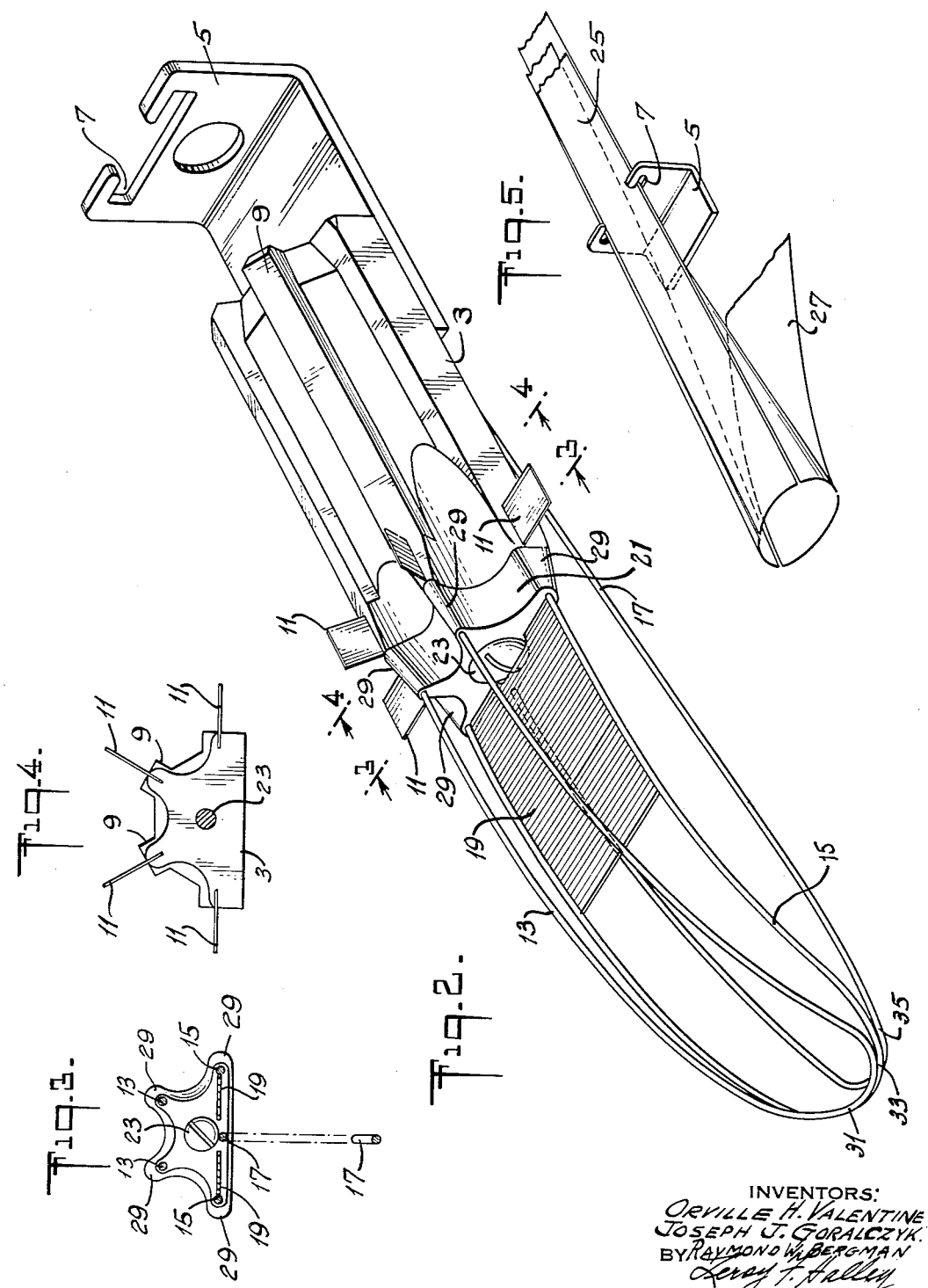
INVENTORS:
ORVILLE H. VALENTINE
JOSEPH J. GORALCZYK
BY RAYMOND W. BERGMAN
Leroy F. Alley
ATTORNEY

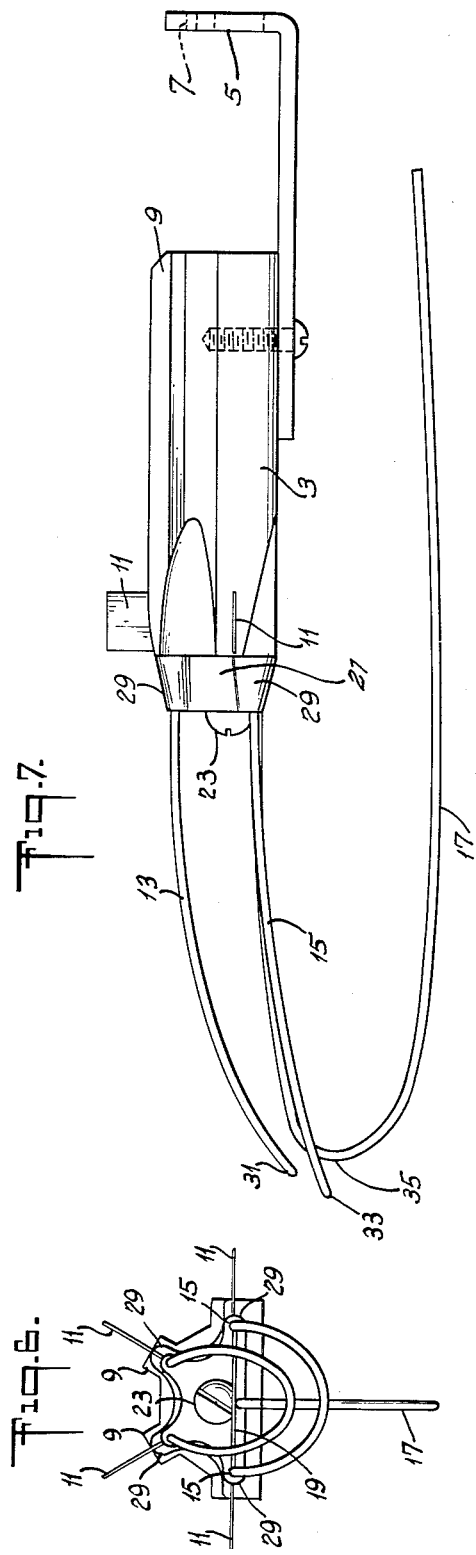
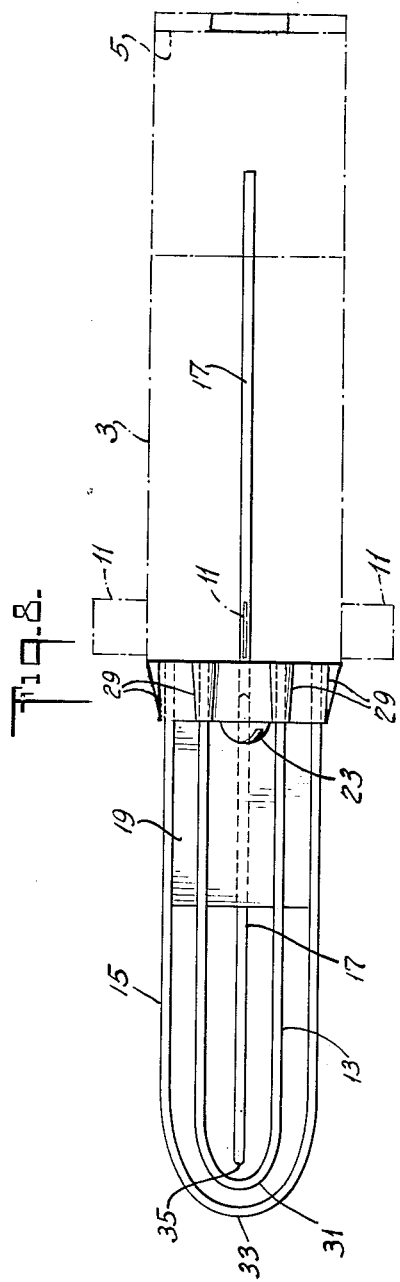

Oct. 18, 1955     O. H. VALENTINE ET AL     2,720,678
APPARATUS FOR SEPARATING THE MEMBRANES OF ANIMAL INTESTINES
Filed Oct. 16, 1953     4 Sheets-Sheet 4
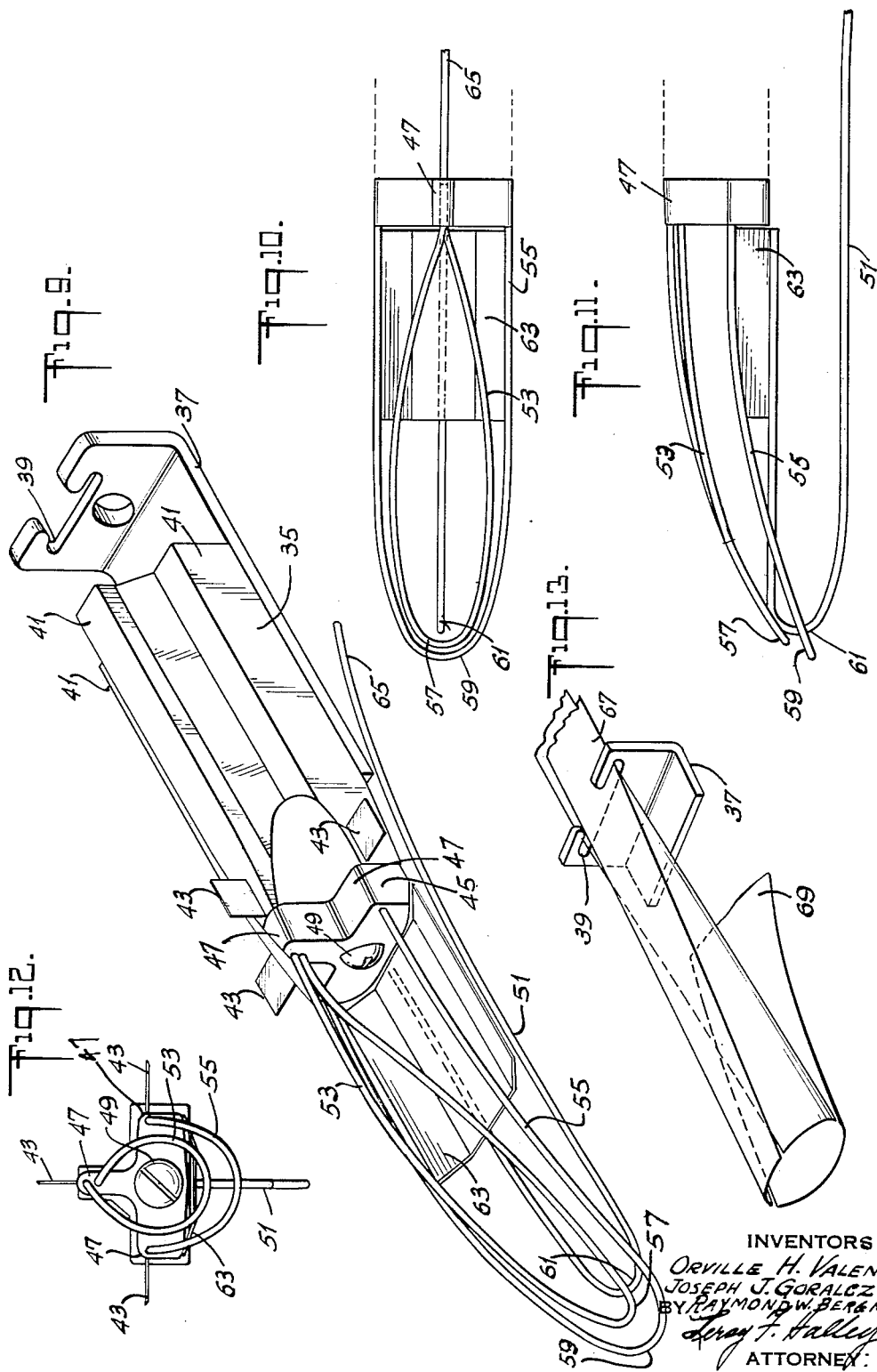
INVENTORS:
ORVILLE H. VALENTINE
JOSEPH J. GORALCZYK
BY RAYMOND W. BERGMAN
ATTORNEY

United States Patent Office

2,720,678
Patented Oct. 18, 1955

2,720,678

APPARATUS FOR SEPARATING THE MEMBRANES OF ANIMAL INTESTINES

Orville H. Valentine and Joseph J. Goralczyk, Chicago, and Raymond W. Bergman, Joliet, Ill., assignors to Ethicon, Inc., a corporation of New Jersey Application October 16, 1953, Serial No. 386,486

11 Claims. (Cl. 17—43)

This invention relates to means for the treatment and manipulation of animal intestines and particularly to means adapted for the separation of membranes of beef intestines and providing improved catgut for use in the manufacture of strings for tennis racquets, surgical sutures and ligatures, and improved casings for filling with sausage meat, as well as for other purposes.

At the present time catgut for use in the manufacture of surgical sutures and ligatures is primarily made from the submucosal layer of the sheep intestine. Two ribbons are obtained by the longitudinal slitting of a washed and cleaned casing. The ribbons are scraped to remove the mucosa and in the course of the scraping operation, the serosal and muscularis tissue layers, as well as the mesentery, are removed. This leaves the submucosal tissue layer of collagen with remnants of non-collagenous protein present. Subsequent steps in processing the ribbons are designed to free them as completely as possible from all non-collagenous tissue materials. Strands are made by combining and twisting two or more ribbons. Strands used for making sutures and ligatures are cut into appropriate lengths, sterilized, and sealed in glass tubes with a tubing fluid. It is in this form that catgut sutures and ligatures are supplied to the medical profession. Gut for use in the manufacture of tennis strings has been prepared from the serosal tissue layer of beef intestines and from the submucosal tissue layer of sheep intestines.

Methods heretofore used in the cutting of beef intestines into two or more strips have resulted in a high frequency of breakage of the strips during the cutting process. The separation of the serosal tissue layer from the submucosal tissue layer of beef intestines and simultaneous cutting of two or more strips of the serosal tissue layer has been practiced as a method for obtaining strips for use in the manufacture of tennis racquet strings and also as a method by which the submucosal tissue layer is provided intact for use in the manufacture of sausage casings. Processes of the nature practiced heretofore have required the use of complicated machinery and have particularly included conditioning of the beef intestines which involved a crushing operation designed to weaken the muscularis tissue layer which acts to bond the serosal tissue layer and submucosal tissue layer. Because the connective tissue layers are so firmly held together by the muscularis tissue layer between them, the breakages of intestines were frequent even with the method heretofore practiced, which included the preconditioning crushing step.

It is a general object of this invention to provide means for splitting animal intestines into two or more strips.

A more specific object of the present invention is to provide means for facilitating the separation of the serosal tissue layer from the submucosal tissue layer of the beef intestine.

Another object of this invention is to provide means for separating the serosal tissue layer and the submucosal tissue layer of beef intestines and simultaneously splitting the serosal tissue layer into two or more strips.

The invention is embodied in a splitting peg designed for separating the serosal tissue layer from the submucosal tissue layer of beef intestines and splitting the serosal tissue layer into two or more strips, the splitting peg comprising a body having cutting means, a means for centering the intestine and means for separating the serosal tissue layer from the submucosal tissue layer.

The splitting peg of this invention designed for separating the serosal tissue layer from the submucosal tissue layer of beef intestines and splitting the serosal tissue layer into two or more strips will now be described with reference to the drawings in which:

Figure 2 is a view in perspective of one modification of the splitting peg which provides for the obtaining of three ribbons from the serosal tissue layer;

Figure 3 is a cross-sectional view of the device taken along the line 3—3 of Figure 2;

Figure 4 is a cross-sectional view of the splitting device taken along the line 4—4 of Figure 2;

Figure 5 is a view in perspective of a portion of the splitting peg functioning as a guide and showing two strips of the split intestine in position in the guide;

Figure 6 is an end elevation of the splitting peg;

Figure 7 is a side elevation of the splitting peg;

Figure 8 is a plan view particularly designed to show the fore part of the splitting peg;

Figure 9 is a view in perspective of a modification of the splitting peg which provides for the obtaining of two ribbons from the serosal tissue layer;

Figure 10 is a plan view designed to show the fore part of the modification of the splitting peg;

Figure 11 is a side elevation of the fore part of the modification of the splitting peg;

Figure 12 is an end elevation of the modification of the splitting peg; and

Figure 13 is a view in perspective of a portion of the modification of the splitting peg functioning as a guide and showing two strips of the split intestine in position in the guide.

Figure 1:
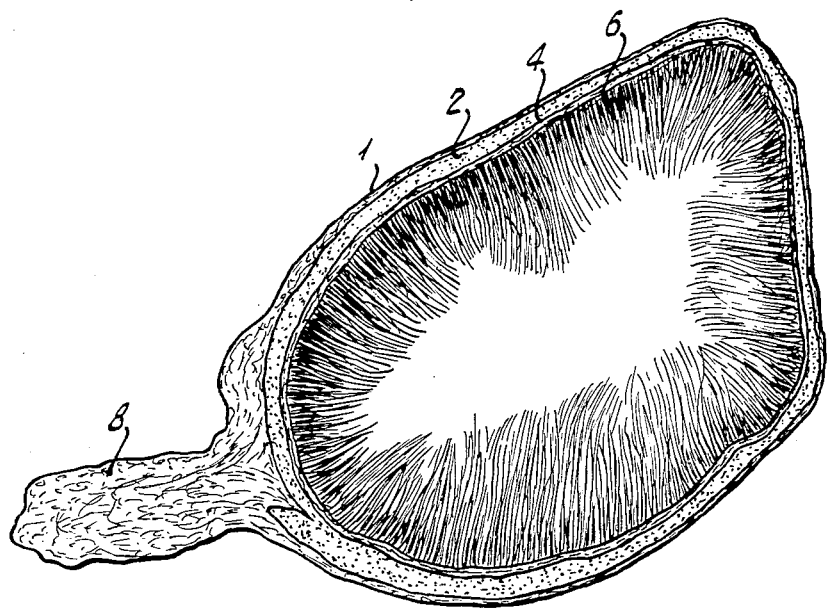
Figure 1 is an enlarged cross-sectional view of an animal intestine.

An animal intestine, as shown in Figure 1, is composed of two connective tissue layers, an outer serous layer 1 and an inner submucosal layer 4. Both these layers consist essentially of collagen. A muscularis tissue layer 2, which consists of transverse and longitudinal muscle fibers permeated with blood vessels and nerve tissue, is positioned between the connective tissue layers. The inner layer of connective tissue is lined with a mucosal layer 6 which is readily removed by mechanical scraping and squeezing operations. The mesentery 8, which serves to carry lymphatics, blood vessels, and nerves to the intestine is attached to the serous layer of connective tissue and amounts to a physical continuation of that layer. The outer surface of the membrane is generally lined with considerable amounts of fat, and particularly heavy deposits of fat are usually present at the place of attachment of the mesentery to the intestine.

In order to describe with particularity that form of the invention embodying the splitting peg over which an animal intestine is drawn, during the method of this invention, the various features of the splitting peg and its modifications will now be described in detail with reference to the drawings.

The modification of the splitting peg which provides three strips of serosal tissue layer is shown in Figures 2 to 8 inclusive, and like numbers in these drawings refer to like parts. Referring to Figure 2, main body portion 3, which may be fabricated of any solid material, such as metal or plastic, has four cutting blades 11, positioned in the center and at the fore parts of separating ridges 9, which assist in providing straight cutting of the serosal tissue layer and ribbons of even and equal width. The cutting blades and separating ridges are also illustrated in Figures 4, 6, and 7, which show the plane of the two upper separating ridges to be parallel to the plane of the two lower separating ridges. Fore body portion 21 of the splitting peg attached to the main body portion 3 by an assembly screw 23, is preferably fabricated of a metal. Ridges 29 of the fore body portion are a continuation of separating ridges 9 of the main body portion of the splitting peg. Upper guide loop 13, which is preferably fabricated of a flexible and springy metal, is U-shaped and curved so that its radius of curvature is about 5½ to 6½ inches. The two ends of the upper guide loop 13 are attached to fore body portion 21 adjacent to and aligned with the upper two cutting blades 11, as illustrated in Figures 2 and 3. Lower guide loop 15, which is also preferably fabricated of a springy and flexible metal, is U-shaped and curved so that its radius of curvature is greater than that of the upper guide loop and preferably about 8½ to 9½ inches. The two ends of the lower guide loop are attached to the fore body portion 21 adjacent to the bottom two cutting blades 11, as illustrated in Figures 2 and 3. In general, the radius of the upper guide loop is such that a continuation of this loop would intersect the lower guide loop at approximately its loop end. Centering loop 17, which is preferably fabricated of a flexible springy metal is attached to the fore body portion 21 of the splitting peg, as illustrated in Figures 2 and 3 and has a free end, as illustrated in Figure 7. Flexible centering loop 17 extends beyond the fore body portion 21 and has a free end positioned below the plane of the lower separating ridges and an end centrally attached to fore body portion 21 between the lower separating ridges, as illustrated in Figures 3 and 6. Centering loop 17 is preferably positioned in a plane vertical to the plane of the lower separating ridges. Upper guide loop 13 and lower guide loop 15 are preferably positioned in separate cylindrical planes and have their axes perpendicular to the plane of centering loop 17. Upper guide loop 13 preferably extends beyond the centering loop 17 and lower guide loop 15 extends beyond centering loop 17 and upper guide loop 13. It is preferred that a stiffening plate 19, as illustrated in Figures 2, 3, 6, and 8, be attached to fore body portion 21 and also to lower guide loop 15. The stiffening plate 19 functions to strengthen and impart resistance to distortion to lower guide loop 15. When an animal intestine is drawn over the splitting peg and particularly when an animal intestine, which has been preconditioned by soaking in dilute sodium chloride solution, is drawn over tthe splitting peg so that a portion of the serosal layer of connective tissue of the intestine is positioned over the upper guide loop 13 and the submucosal tissue layer, a portion of the serosal layer, and the attached mesentery are positioned under lower guide loop 15 and centering loop 17, the serosal tissue layer is readily separated from the rest of the intestine and in the course of the separation, upper guide loop 13 is depressed so that loop end 31 assumes a position just above or even below loop end 33 and in front of loop end 35 of the centering loop. As the intestine is steadily pulled over the splitting peg, three strips of the serosal tissue layer are cut and drawn through guide slot 7 of ribbon guide 5, which is attached to main body portion 3 by a screw, as shown in Figures 2 and 7. Centering loop 17 functions to maintain the intestine in the course of its passage over the splitting peg in a position such that the mesentery is always adjacent to and extending below the said centering loop. The top portion of the intestine containing the smooth part thereof, and in particular, the smooth part of the serosal connective tissue layer passes over the top of the main body portion 3 and over upper guide loop 13. Figure 5 shows three ribbons 25, after they have been cut by cutting blades 11, in position in guide slot 7 of ribbon guide 5, and also shows the position of the remainder of the animal intestine 27 which does not provide the three ribbons 25 of the serosal layer of connective tissue. Portion 27 of the animal intestine is composed of a part of the serosal tissue layer, the intact submucosal tissue layer and the mesentery. The intact submucosal tissue layer may be used in the manufacture of sausage casings, or ribbons may be obtained from it which may also be used in the manufacture of surgical sutures and ligatures.

Figures 9–13 inclusive show the modification of the splitting peg which provides two strips of serosal tissue layer from an animal intestine, and like numbers in these drawings refer to like parts. Referring to Figure 9, main body portion 35, may be fabricated of any solid material including metals and plastics. Three cutting blades 43 are positioned in the center and at the fore parts of separating ridges 41. The separating ridges assist in providing straight cutting of the serosal tissue layer and ribbons of even and equal width. The cutting blades and separating ridges are also illustrated in Figures 10 and 12. Fore body portion 45 of the splitting peg is attached to main body portion 35 by an assembly screw 49 and is preferably fabricated of a metal. Ridges 47 of fore body portion 45 are continuations of separating ridges 41 of the main body of the splitting peg. Upper guide loop 53, which is preferably fabricated of a flexible and springy metal, is in the shape of a loop and is curved so that its radius of curvature is about 5½ to 6½ inches, as illustrated particularly in Figure 11. The two ends of upper guide loop 53 are both attached to the ridge continuation 47 of fore body portion 45, which is adjacent to and aligned with the upper cutting blade, as illustrated in Figures 9, 10, and 12. Lower guide loop 55, which is also preferably fabricated of a springy and flexible metal is U-shaped and curved so that its radius of curvature is greater than that of upper guide loop 53 and preferably about 8½ to 9½ inches. The two ends of the lower guide loop are attached to fore body portion 45 adjacent to and aligned with the two bottom cutting blades 43, as illustrated in Figures 9 and 12. In general, the radius of the upper guide loop is such that a continuation of this loop would intersect the lower guide loop at approximately its loop end, and this relationship is particularly illustrated in Figure 11. Centering loop 51, which is preferably fabricated of a flexible springy metal, is attached to fore body portion 45, and in this modification of the splitting peg, centering loop 51 is attached to fore body portion 45 at a point below cutting blades 43, as illustrated in Figures 11 and 12. One end of the centering loop 51 is not attached, as illustrated in Figures 9 and 11, and preferably extends back of fore body portion 45 and the free end of centering loop 51 is positioned below the lower cutting blades and separating ridges. Upper guide loop 53 and lower guide loop 55 are positioned in separate cylindrical planes and have their axes perpendicular to the plane of centering loop 51. Upper guide loop 53 preferably extends slightly beyond centering loop 51 and lower guide loop 55 extends beyond the centering loop and also beyond the upper guide loop. It is preferred that a stiffening plate 63, as illustrated in Figures 9, 10, 11, and 12, be attached to lower guide loop 55. The stiffening plate 63 functions to strengthen and impart resistance to distortion to lower guide loop 55. When an animal intestine is drawn over the splitting peg and particularly when an animal intestine which has been pre-conditioned by soaking in dilute sodium chloride solution, is drawn over the splitting peg so that the smooth part of the serosal tissue layer is positioned over upper guide loop 53 and the submucosal layer, a portion of the serosal tissue layer, and the attached mesentery are positioned under lower guide loop 55 and centering loop 51, the upper portion of the serosal tissue layer is readily separated from the rest of the intestine and upper guide loop 53 is depressed so that upper guide loop end 57 assumes a position just above or even slightly below lower guide loop end 59 and in front of centering lop end 61. As the intestine is steadily pulled over the splitting peg two strips of serosal tissue layer 67 are cut and drawn through guide slot 39 of ribbon guide 37, which is attached to main body portion 35 as shown in Figure 9. Centering loop 51 functions to maintain the intestine in the course of its passage over the splitting peg in a position such that the mesentery is always adjacent to and extending below the centering lop. The top portion of the intestine, which contains the smooth part of the serosal connective tissue layer which is opposite to the mesentery, passes over the top of main body portion 35 and over upper guide loop 53. Figure 13 shows two ribbons 67 after they have been cut by cutting blades 43 in position in guide slot 39 of ribbon guide 37, and also shows the position of the remainder of the animal intestine 69. Portion 69 of the animal intestine is composed of a part of the sersoal tissue layer, the intact submucosal tissue layer, and the mesentery. The intact submucosal tissue layer may be used in the manufacture of sausage casings or ribbons may be cut from it which may also be used in the manufacture of surgical sutures and ligatures.

In the practice of the process of this invention raw animal intestines and particularly beef intestines, are preconditioned. The intestines as they are customarily received from the abattoir where they have been stripped to remove fecal matter are subjected to a soaking operation and it is preferred that the intestine be soaked in a 5% aqueous sodium chloride solution for a time of from 4 to 18 hours. The soaking operation acts to loosen the bond between the serosal tissue layer and the submucosal tissue layer and probably accomplishes this due to its action of swelling the muscularis tissue layer and reducing the firmness with which this layer holds together the two connective tissue layers. Water will also effect the same loosening action, however aqueous sodium chloride solution is preferred because salt acts as a preservative by reducing bacterial action. The soaked intestine may be immediately drawn over the splitting peg, described in detail above, to remove two or more strips of the serosal tissue layer from the intestine.

The size of animal intestines varies with the species and there is a considerable variation in the intestinal diameter within the same species, depending upon the portion of the intestine used and the age of the animal. In general, the peg taken in conjunction with the guide loops should be of such a size that the intestine to be drawn over it will be kept taut but not stretched to any substantial degree.

Although the process and use of the splitting peg have been particularly described with respect to their use in removal of two or more strips of serosal tissue layer from an animal intestine, it is also contemplated that the process and splitting peg may be used to provide two or more strips of intestine. In this modification of the process, each strip consists of three layers; submucosal tissue layer, muscularis layer, and serosal tissue layer. The strips of intestine may readily be separated by mechanical means and subsequently scraped to provide a serosal tissue layer and a submucosal tissue layer substantially free from the muscularis tissue layer. When the process and the splitting peg are used to provide two or more strips of intestine, the soaking step prior to the splitting operation described above, may be obviated and the strips, instead of the whole intestine, may be soaked before mechanical separation into individual connective tissue layers.

The invention in its process aspects has been described with mention of particular details of the procedure and the features of the invention directed to the splitting peg have been described with particular reference to specific embodiments; accordingly, it is to be understood that the invention is not to be limited to its specific aspects and details, but is to be construed broadly and to be restricted solely by the scope of the appended claims.

What is claimed is:

1. A splitting peg for separating a plurality of serosal tissue ribbons from a bovine casing comprising; a body member having a plurality of attached equally spaced cutting members, a centering member extending below the body member, upper and lower curved guide members in separate cylindrical planes, extending beyond the centering member, and having axes perpendicular to the plane of the centering member, the upper guide member having a radius of curvature less than the radius of curvature of the lower guide member, and each guide member being attached to the body member adjacent to and aligned with at least one cutting member.

2. A splitting peg for separating a plurality of serosal tissue ribbons from a bovine casing comprising; a body member having a plurality of attached, equally spaced cutting members, a centering member extending below the body member, upper and lower curved guide members in separate cylindrical planes, extending beyond the centering member, and having axes perpendicular to the plane of the centering member, the upper guide member having a radius of curvature less than the radius of curvature of the lower guide member, and each guide member being attached to the body member adjacent to and aligned with at least one cutting member, the radius of curvature of the upper guide loop having a relation to the radius of curvature of the lower guide loop such that a continuation of the upper guide loop end would intersect the lower guide loop end at approximately the loop end.

3. A splitting peg for separating a plurality of serosal tissue ribbons from a bovine casing comprising; a body member having a plurality of attached, equally spaced cutting members, a centering member extending below the body member, flexible upper and lower curved guide members in separate cylindrical planes, extending beyond the centering member, and having axes perpendicular to the plane of the centering member, the upper guide member having a radius of curvature less than the radius of curvature of the lower guide member, and each guide member being attached to the body member adjacent to and aligned with at least one cutting member, the radius of curvature of the upper guide loop having a relation to the radius of curvature of the lower guide loop such that a continuation of the upper guide loop end would intersect the lower guide loop end at approximately the loop end.

4. A splitting peg for separating three serosal tissue ribbons from a bovine casing comprising; a body member having four attached, equally spaced cutting members, a centering member extending below the body member, flexible upper and lower curved guide members in separate cylindrical planes, extending beyond the centering member, and having axes perpendicular to the plane of the centering member, the upper guide member having a radius of curvature less than the radius of curvature of the lower guide member, and each guide member being attached to the body member adjacent to and aligned with two cutting members, the radius of curvature of the upper guide loop having a relation to the radius of curvature of the lower guide loop such that a continuation of the upper guide loop end would intersect the lower guide loop end at approximately the loop end.

5. A splitting peg for separating two serosal tissue ribbons from a bovine casing comprising; a body member having three attached, equally spaced cutting members, a centering member extending below the body member, flexible upper and lower curved guide members in separate cylindrical planes, extending beyond the centering member, and having axes perpendicular to the plane of the centering member, the upper guide member having a radius of curvature less than the radius of curvature of the lower guide member, and each guide member being attached to the body member adjacent to and aligned with at least one cutting member, the radius of curvature of the upper guide loop having a relation to the radius of curvature of the lower guide loop such that a continuation of the upper guide loop end would intersect the lower guide loop end at approximately the loop end.

6. A splitting peg for separating a plurality of serosal tissue ribbons from a bovine casing comprising; a body member having upper and lower separating ridges, the plane of the upper being approximately parallel to the plane of the lower separating ridges; a cutting member in the forward end of each separating ridge; a flexible centering loop positioned in a plane vertical to the plane of the lower separating ridges, and extending below the body member, having a free end positioned below the plane of the lower separating ridges and one end centrally attached to the body member between the lower separating ridges; and upper and lower flexible curved guide loops in separate cylindrical planes with axes perpendicular to the plane of the centering loop, the upper guide loop extending beyond the centering loop and having fixed loop ends integrally attached to at least one upper ridge member and aligned with at least one cutting member and having a radius of curvature less than the radius of curvature of the lower guide loop, the radius of curvature of the upper guide loop having a relation to the radius of curvature of the lower guide loop such that a continuation of the upper guide loop end would intersect the lower guide loop at approximately the loop end; the lower guide loop extending beyond the loop end of the upper guide loop, and having each fixed loop end integrally attached to a lower separating ridge and aligned with a cutting member.

7. A splitting peg for separating three serosal tissue ribbons from a bovine casing comprising; a body member having two upper and two lower separating ridges, the plane of the upper separating ridges being approximately parallel to the plane of the lower separating ridges; a cutting member in the forward end of each separating ridge; a flexible centering loop positioned in a plane vertical to the plane of the lower separating ridges and extending below the body member with an end unattached and positioned below the plane of the lower separating ridges and an end centrally attached to the body member between the lower separating ridges; upper and lower flexible curved guide loops in separate cylindrical planes with axes perpendicular to the plane of the centering loop, the upper guide loop having a radius of curvature of about 5½ to 6½ inches and extending beyond the centering loop with each fixed loop end integrally attached to an upper separating ridge and aligned with a cutting member, the lower guide loop end extending beyond the loop end of the upper guide loop, and with each fixed loop end integrally attached to a lower separating ridge and aligned with a cutting member, the radius of curvature of the upper guide loop having a relation to the radius of curvature of the lower guide loop such that a continuation of the upper guide loop end would intersect the lower guide loop end at approximately the loop end.

8. A splitting peg for separating two serosal tissue ribbons from a bovine casing comprising; a body member having one upper and two lower separating ridges; a cutting member in the forward end of each separating ridge; a flexible centering loop positioned in a plane vertical to the plane of the lower separating ridges and extending below the body member, having a free end positioned below the plane of the lower separating ridges and one end centrally attached to the body member between the lower separating ridges; upper and flexible lower curved guide loops in separate cylindrical planes with axes perpendicular to the plane of the centering loop, the upper guide loop extending beyond the centering loop with fixed loop ends integrally attached to the upper ridge member and aligned with a cutting member, and having a radius of curvature of about 5½ to 6½ inches, the lower guide loop extending beyond the loop end of the upper guide loop, and with each fixed loop end integrally attached to a lower separating ridge and aligned with a cutting member, the radius of curvature of the upper guide loop having a relation to the radius of curvature of the lower guide loop such that a continuation of the upper guide loop end would intersect the lower guide loop at approximately the loop end.

9. A splitting peg for separating a plurality of serosal tissue ribbons from a bovine casing comprising; a body member having upper and lower separating ridges, the plane of the upper being approximately parallel to the plane of the lower separating ridges; a cutting member in the forward end of each separating ridge; a flexible centering loop positioned in a plane vertical to the plane of the lower separating ridges, and extending below the body member, having a free end positioned below the plane of the lower separating ridges and one end centrally attached to the body member between the lower separating ridges; and upper and lower flexible curved guide loops in separate cylindrical planes with axes perpendicular to the plane of the centering loop, the upper guide loop, having a radius of curvature of about 5½ to 6½ inches, extending beyond the centering loop and having fixed loop ends integrally attached to at least one upper ridge member and aligned with at least one cutting member, the lower guide loop, having a radius of curvature of about 8½ to 9½ inches, extending beyond the loop end of the upper guide loop, and having each fixed loop end integrally attached to a lower separating ridge and aligned with a cutting member.

10. A splitting peg for separating three serosal tissue ribbons from a bovine casing comprising; a body member having two upper and two lower separating ridges, the plane of the upper separating ridges being approximately parallel to the plane of the lower separating ridges; a cutting member in the forward end of each separating ridge; a flexible centering loop positioned in a plane vertical to the plane of the lower separating ridges and extending below the body member with an end unattached and positioned below the plane of the lower separating ridges and an end centrally attached to the body member between the lower separating ridges; upper and lower flexible curved guide loops in separate cylindrical planes with axes perpendicular to the plane of the centering loop, the upper guide loop having a radius of curvature of about 5½ to 6½ inches and extending beyond the centering loop with each fixed loop end integrally attached to an upper separating ridge and aligned with a cutting member, the lower guide loop end having a radius of curvature of about 8½ to 9½ inches, extending beyond the loop end of the upper guide loop, and with each fixed loop end integrally attached to a lower separating ridge and aligned with a cutting member.

11. A splitting peg for separating two serosal tissue ribbons from a bovine casing comprising; a body member having one upper and two lower separating ridges; a cutting member in the forward end of each separating ridge; a flexible centering loop positioned in a plane vertical to the plane of the lower separating ridges and extending below the body member, having a free end positioned below the plane of the lower separating ridges and one end centrally attached to the body member between the lower separating ridges; upper and flexible lower curved guide loops in separate cylindrical planes with axes perpendicular to the plane of the centering loop, the upper guide loop extending beyond the centering loop with fixed loop ends integrally attached to the upper ridge member and aligned with a cutting member, and having a radius of curvature of about 5½ to 6½ inches, the lower guide loop having a radius of curvature of about 8½ to 9½ inches, extending beyond the loop end of the upper guide loop, and with each fixed loop end integrally attached to a lower separating ridge and aligned with a cutting member.

References Cited in the file of this patent

UNITED STATES PATENTS

| | | |
|---|---|---|
| 694,817 | Anderson | Mar. 4, 1902 |
| 2,505,964 | Hincks | May 2, 1950 |
| 2,595,638 | Castelow | May 6, 1952 |

FOREIGN PATENTS

| | | |
|---|---|---|
| 24,123 | Great Britain | 1905 |